Dec. 16, 1958 J. R. HAINES Re. 24,577

MACHINE FOR AND METHOD OF FORMING HOLLOW PLASTIC ARTICLES

Original Filed Oct. 19, 1950 2 Sheets-Sheet 1

INVENTOR;
JOHN R. HAINES
BY
Jerome R. Cox
ATT'Y.

INVENTOR;
JOHN R. HAINES
BY
Jerome R. Cox
ATT'Y.

United States Patent Office

Re. 24,577
Reissued Dec. 16, 1958

24,577

MACHINE FOR AND METHOD OF FORMING HOLLOW PLASTIC ARTICLES

John R. Haines, deceased, late of Columbus, Ohio, by Injection Molding Company, Kansas City, Mo., assignee Original No. 2,632,202, dated March 24, 1953, Serial No. 191,031, October 19, 1950. Application for reissue July 9, 1956, Serial No. 596,809

8 Claims. (Cl. 18—5)

Matter enclosed in heavy brackets [ ] appears in the original patent but forms no part of this reissue specification; matter printed in italics indicates the additions made by reissue.

The invention disclosed in this application relates to machines for and methods of forming hollow plastic articles and filling such hollow plastic articles immediately after they are formed.

Heretofore plastic tubes have been extruded from plastic extrusion mechines, and plastic bottles have been formed by extruding gobs or tubes of plastic material which have been blown by the use of compressed air. I propose to extrude tubes into appropriate position relative to open molds and then to close the molds over these tubes and blow the tubes into the shape of hollow containers in said molds in regular sequence. I propose that the tubes shall be formed as extruded so that approximately exactly the necessary material is supplied at each region at which greater or less materials are required so that the final plastic container shall have a substantially uniform wall thickness throughout without stress and strain and without weaknesses or waste of material which might otherwise be occasioned.

One of the objects of my invention therefore is the provision of a new plastic diehead useful with any standard extrusion machine *of the type adapted to deliver the plastic material to the die head in heat-softened, semi-fluid condition; standard machines for delivering plasticated material being shown, for example, in Ferngren Patent 2,230,188, Jargstroff et al., Patent 2,519,375 and numerous other patents heretofore granted.*

A further object of my invention is the provision of a new machine for filling molds with plastic.

A further object of my invention is the provision of a machine capable of and a method for forming hollow plastic containers having substantially uniform sidewalls.

A further object of my invention is the provision of methods and a machine for forming hollow plastic containers substantially free of weaknesses caused by lack of uniformity.

A further object of my invention is the provision of methods of and a machine for saving materials in the formation of hollow plastic containers.

A further object of my invention is the provision of a combination of devices for continuously supplying *heat-softened* plastic to a plurality of molds from a single plastic extrusion machine *of the type referred to hereinbefore,* in which the individual molds operate in sequence so that the flow of plastic from the extrusion machine is substantially continuous.

A further object of my invention is the provision of a plurality of plastic extrusion machines each connected to a single mold filling mechanism whereby plastic of different material, or having different colors, etc. may be supplied at the same time to a single mold.

A further object of my invention is the provision of means for supplying a sterile liquid to a hollow container immediately after the container is formed and while the container is hot and preferably still in the mold whereby the container may be filled with sterile liquid immediately after the container is formed and may be sealed so that the container may not have a chance to be contaminated.

A feature of my invention is the provision of a hollow plunger formed with a tapered end operating within a tapered outlet for a cylinder forming a part of the mold delivering portion of the diehead.

A further feature of my invention is the provision of a cam for controlling the operation of the plunger controlling at each instant the amount of plastic being delivered from the diehead.

A further feature of my invention is the provision of a pinion nut, and a rack for controlling the position of the plunger which itself controls the amount of plastic delivered by the diehead to a mold.

Further objects and features of my invention will be apparent from the reading of the subjoined specification and claims and from a consideration of the accompanying drawings showing several modifications and embodiments of my invention.

Figure 1:
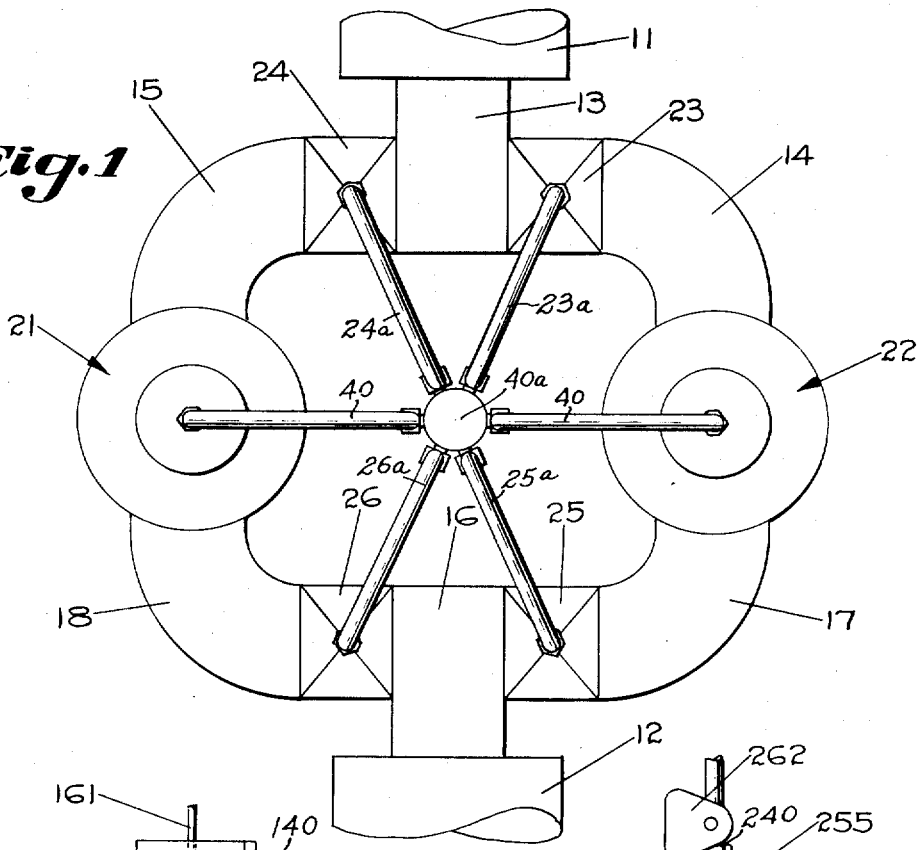
Fig. 1 is a plan view (partly diagrammatic) showing a combination of a pair of plastic extrusion machines, a pair of plastic dieheads for forming hollow containers and connections between both of the extrusion machines and both of the plastic dieheads.

Referring still to the drawings for a detailed description of the embodiments of my invention, it may be seen that I have shown fragmentarily or diagrammatically in Fig. 1 a pair of plastic extrusion machines designated as 11 and 12. [Plastic may be extruded] *These are conventional machines of the kind referred to hereinbefore, and it will be understood from the ensuing description that each is designed to be continuously operative to discharge the heat-softened semi-fluid plastic material from which the desired containers are to be formed; the plastic material thus discharged under pressure is arranged to flow* from these machines through passageways designated as 13, 14, 15, 16, 17, 18, to a pair of plastic dieheads 21 and 22. [The] *In the case of each extrusion machine, the plastic material which issues therefrom in the form of a steady, uninterrupted discharge is caused to flow first to one of said die heads and then to the other in alternate fashion under control of a pair of valves (23, 24 or 25, 26), one valve of each pair being open when the other is closed, and vice versa. More particularly* passageways 13 and 14 lead from the extrusion machine 11 to the diehead 22 and the passage of plastic through said passageways 13 and 14 is controlled by a valve 23. Passageways 13 and 15 lead from the extrusion machine 11 to the diehead 21 and passage of plastic through said passageways 13 and 15 is controlled by a valve 24. Passageways 16 and 17 lead from extrusion machine 12 to diehead 22 and the passage of plastic through said passageways 16 and 17 is controlled by a valve 25. Passageways 16 and 18 lead from extrusion machine 12 to diehead 21 and the passage of plastic through said passageways 16 and 18 is controlled by a valve 26. [The] *While it*

*will be obvious to those versed in the art that other cycling arrangements may be employed, the* valves 23, 24, 25, and 26 [are] *conveniently can be* controlled by air pressure supplied through conduits 23a, 24a, 25a and 26a, respectively and from a valve chest and timer 40a, said air pressure and conduits providing means for opening and closing said valves *in such properly timed relation as to effect the feeding of plastic alternately to the respective dieheads.*

My novel diehead 22 is designed to form plastic containers such as, for example, the container 30 and comprises essentially (a) a sleeve 31 into which plastic is extruded from conduits 14 and 17, and (b) a mandrel or hollow plunger 32 positioned in and cooperating with the sleeve to control the extrusion of plastic therefrom. Normally *the still heated semi-fluid* plastic is extruded from the diehead 22 in the form of a tube having a varying thickness throughout its length and is controllable at any point as desired by the position of the mandrel 32 in order to control the wall thickness of the finished container and to insure preferably that such wall thickness shall be substantially uniform. Associated with the sleeve 31 I provide a guide 33 (which might be formed if desired as a part of the sleeve 31) and which serves to position and guide the mandrel 32 as it is moved longitudinally within the sleeve 31. The guide 33 is provided with a spline recess 34 in which there is positioned a spline 35 cooperating with a slot 36 formed in the mandrel 32 and maintaining the mandrel 32 against rotation. The mandrel 32 is formed with a central bore 37 through which air under pressure passes into the interior of the plastic container being formed after the mold has been closed over the tube. Air is supplied to the central bores 37 by means of flexible tubes 40 such tubes being connected to a valve chest and timer 40a. The supply of air is of course for the purpose of forming the tube [as may be desired into] *by expanding it within the mold to form* a finished plastic container. The mandrel 32 may, if desired, be formed integrally in one piece or it may (as shown) be provided with a separate tip 38 secured to the outlet end thereof and formed as shown with a taper which may be at any desired angle to the axis. The sleeve 31 may also be formed integrally with a tapered outlet opening but for purposes of manufacture and assembly I prefer to provide it with an outlet tip 39 which is formed of a plurality of rings. The outlet opening (e. g. the tip 39) is tapered internally and thus cooperates with the contour of the tip 38.

Associated with the outlet end of the diehead 22 is shown a mold 41 formed of halves 42 and 43 which open periodically to discharge plastic containers such as 30 formed by the machine and close over the tube after it is extruded through the diehead 22 to the approximate proper length. The mold in closing pinches the lower end of the tube and in doing so, seals the end of the tube by pressing the sidewalls together. By another method, I raise the mandrel 32 so as to extrude first a solid slug, disk or rod of the length desired to form the bottom of the container. Then I immediately lower the plunger to form a tube with the end closed by the disk, the tube having the thickness of sidewalls desired at each point of its length as controlled by the mandrel. The tube is extruded just short of the bottom of the mold. The regular sequence of blowing follows as in the first method. The mold provides a backing for the shaping of the plastic container in the regular operation of the machines. Shown in dotted lines within the mold 41 is a plastic tube 44 as it would appear after it has been extruded and the mold closed but prior to the blowing and shaping of the tube into the desired shape of container 30. It will be noticed that inasmuch as the container 30 to be blown will have a larger circumference and more material adjacent the middle portion thereof, there is a larger portion and larger amount of material adjacent the central portion of the tube so that when the tube has been blown to the shape of the intended container 30, the walls of the container 30 will have a substantially uniform thickness without waste of material and without having any portions of the container 30 weaker than the rest. It is also to be understood that the contour of the tube which is deposited in the mold will depend therefore upon the shape of the final form of the container 30 to be formed. The shape of the mold itself will also conform to the shape of the intended container 30.

I also provide means for raising and lowering the mandrel 32 in accordance with the cross section of the tube at the various longitudinal portions thereof. It may be stated at this point that if it is desired to extrude a large amount of plastic, the mandrel 32 should be raised so that the annular opening between the tip 38 and the outlet 39 will be increased and so that a greater amount of plastic is extruded for shaping in the mold. On the other hand, if it is desired that the amount of plastic extruded shall be small, the mandrel 32 is lowered so that the annular opening between the tip 38 and the outlet 39 is constricted and a smaller amount of plastic is extruded. If, for example, first a small amount of plastic is desired, then a larger amount, and then a smaller amount, during the extrusion process itself the mandrel 32 is first lowered to constrict the opening, is then raised to increase the size of the opening, and is then lowered again to constrict the size of the opening. Thus a tube of any desired shape and size may be extruded. For example, a tube of the size and shape as shown at 44 in Fig. 2 may be provided by first lowering the mandrel 32 then raising the mandrel and then lowering it again. A tube of any desired contour may be thus extruded and tubes of extremely complicated cross section may be formed with substantially uniform sidewalls. In this connection I have formed a container of the complex shape shown at 50a as being released from the mold 50 on the left hand side of Fig. 2. Such a complex container was formed on a machine similar to that illustrated and described herein.

Figure 2:
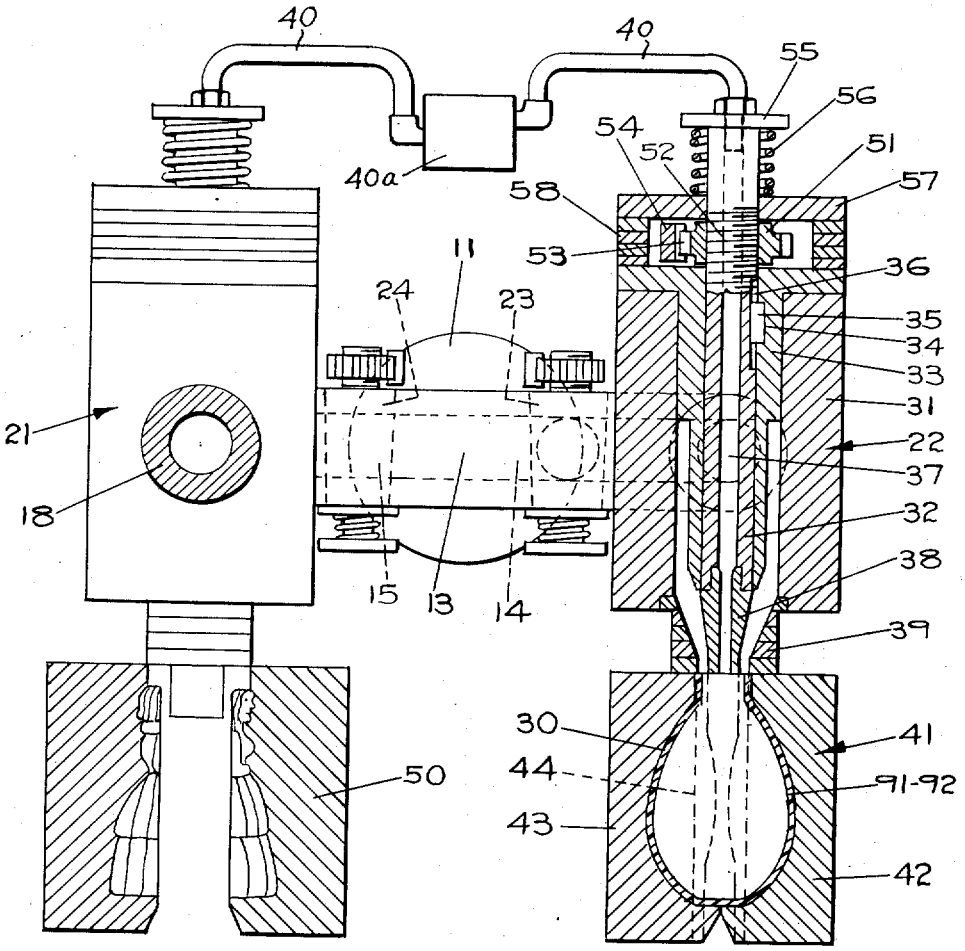
Fig. 2 is a view of the combination of Fig. 1 shown partially in section and partially in elevation.
Figure 5:
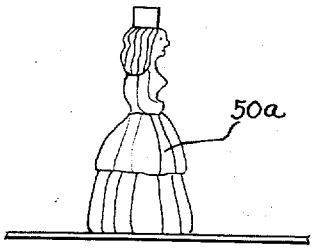
Fig. 5 is a showing of a plastic container which has been produced in a mold of one of my machines for forming hollow plastic articles and has been released from said mold.

The mechanism I have shown in Fig. 2 for raising and lowering the mandrel 32 consists of a nut 51 screwed onto threads 52 formed adjacent the upper end of the mandrel 32, the nut being provided with external teeth 53 which mesh with the teeth on a rack 54. The mandrel 32 is formed wiith a head 55. A spring 56 is interposed between the head 55 and a cover plate 57 for the diehead 22, the cover plate 57 being positioned, if desired, upon a plurality of rings 58 placed upon the top of guide 33. The rack extends through openings formed in the rings 58 and the movement of the rack 54 is controlled by any suitable pneumatic, hydraulic or electrical mechanism synchronized with the operation of the valve 23 and with the opening and closing of the mold 41 so that the contour of the tube 44 is accurately predetermined and insured.

The mold 41 is provided with a recess 91, into which I place a plastic film 92 which has previously been prepared with a reversely printed legend. The plastic container is pressed against the film by air pressure and is thus fused to the film. The printing on the film 92 is on the side toward the inside of the mold and thus the printing is sealed between the film and the main wall of the container but can be read through the transparent film. If desired, the recess 91 may be omitted so that the outside wall of the container will be perfectly smooth.

Figure 3:
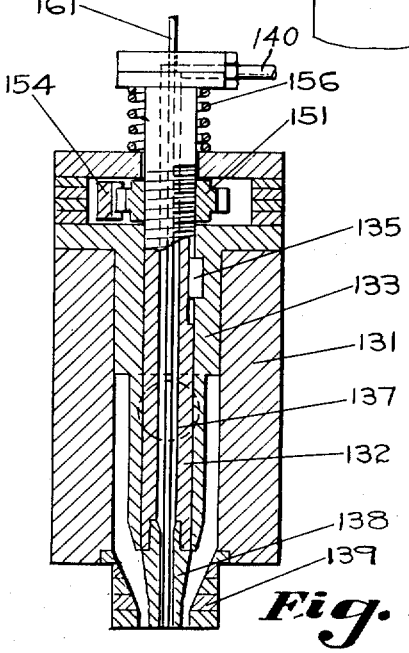
Fig. 3 is a fragmentary view in vertical section corresponding substantially to the sectional portion of Fig. 2 but showing a modified embodiment of my invention.

In Fig. 3 I have shown a modified embodiment of my invention. Therein similar parts are designated by the same numerals with the addition of 100 and there is shown a cylinder 131, a mandrel 132, a guide 133, a spline 135, a tapered tip 138, and a tapered outlet opening 139. Associated with the tube is a nut 151, a rack 154, and a spring 156. Within the bore 137 I extend a tube 161 by which liquid may be supplied to the container after the container is formed after the air pressure released. The tube 161 is spaced from the sidewalls of the bore 137 so that air supplied to the bore 137 by the conduit 140 under pressure is available to shape the tube into the desired form of container.

Figure 4:
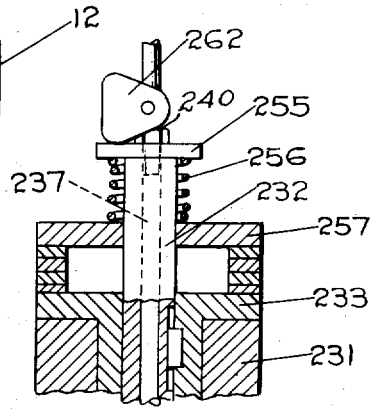
Fig. 4 is a fragmentary view in vertical section corresponding substantially to Fig. 3 and the section portion of Fig. 2 and showing a further modified embodiment of my invention.

In Fig. 4 I have shown another embodiment of my invention wherein similar parts are designated by the same numerals as in Fig. 2 with the addition of 200. Therein there is provided a cylinder 231, a mandrel 232, and a guide 233. The mandrel 232 is provided with a head 255 and a spring 256 is interposed between the head 255 and the cover 257. The mandrel 232 is formed with a bore 237 to which air is supplied by the conduit 240. The movement of the mandrel is controlled by a cam 262. This cam may be shaped as desired to control the movement of the mandrel 232 so that the tube which is extruded shall have the desired contour and the desired amount of plastic may be extruded at various portions of the length of the tube extrusion, it being clear that cams of different shape may be substituted in place of the cam 262 in order to secure different contours of tubes and differing shapes of the finished form of the container.

It will be understood that the mandrel 32 is prevented from movement except by the actuation of either the aforementioned rack 54 and nut 51, or by the cam 262. In other words, the mandrel 32 can only be moved either by the rack 54 and nut 51 or under the control of cam 262.

All of the operation of the machine may be controlled by any standard method of controlling operations in sequence *and, as previously indicated, the valve chest and timer 40a has been shown as an example of one suitable form of apparatus for properly synchronizing the opening and closing of valves 23—26, as well as controlling the intermittent feed of compressed air through ducts 40 to the respective die heads in timed relationship thereto.* Referring especially to the structures shown in Figs. 1 and 2, the cycle of operation is as follows: The valves 23 and 25 open, plastic is extruded into the diehead 22 and passes out and is suspended as a tube of the desired shape between the tapered opening 39 and the mandrel tip 38. The mandrel 32 during this extrusion is moved up and/or down to control the shape of the extruded tube. This movement is controlled by the rack 54 and the nut or pinion gear 51. A strip of plastic film 92 is placed in the recess 91. During this time the valves 24 and 26 have remained closed. Now the valves 23 and 25 are closed and the valves 24 and 26 are opened. At about the same time or immediately thereafter the mold 41 closes forming a backing for the blowing of the container. While plastic is being extruded from the diehead 21, air under pressure flows through the bore 37 extending the tube 44 to form the container 30 and welding the plastic film 92 thereto. Next the air pressure is released. Thereafter the mold is opened and the container 30 is pulled from the opening 39. In the meantime, plastic has been flowing through head 21 to form a plastic tube for the subsequent formation of another container such as 50a. The mold 50 has remained open. Now the valves 24 and 26 are closed and the valves 23 and 25 again are opened. Another tube of plastic is extruded through mold head 22 while the tube of plastic just extruded from diehead 21 is encased in mold 50 as it closes and is blown to shape. Then the mold 50 is opened, the new container 50a is released from the mold. Again valves 23 and 25 are closed and valves 24 and 26 again opened. So plastic continuously flows from extrusion machines 11 and 12 and containers are continuously formed by the dieheads 21 and 22. By the use of the two machines different colored plastic may be supplied to form articles of variegated colors. More than two extrusion machines could be used if desired, or if desired, one of the machines 11 or 12 could be dispensed with. Even if there are the two machines 11 and 12, one, as for example 12, could be made inoperative by closing the valves 25 and 26 during a whole operation. When the valves 25 and 26 are maintained closed during a whole operation the machine is effectively one in which there is effectively a single plastic extrusion machine supplying plastic to a plurality of dieheads.

While a single diehead may be used to receive plastic from a plurality of extrusion machines to produce containers having multicolors, yet I prefer to have at least two dieheads in order to secure continuous operation of the extrusion machine or machines. I may, however, provide more than two and often will use three, four, five or even more in a single operation.

In forming a container of different colors or types of different plastics, I may and often will form the lower part of one type and the upper part of a different type. In order to do so the machine 22 may supply plastic while one part of the container is being extruded and then will be closed off and the machine 12 will supply plastic while the rest is being extruded.

The operation of the embodiment shown in Fig. 4 is exactly the same as the operation of the embodiment shown in Fig. 2. The operation of the embodiment shown in Fig. 3 is the same except that after the air is supplied to shape the container and after the air is released [before the mold is opened, liquid is supplied] *the container is filled, while still in the mold and not yet completely cooled, by introducing liquid thereinto* through the tube 161. Then after the mold is opened, a solid slug of plastic is supplied to seal the open upper end of the container. Alternatively, the upper end of the container may be sealed by twisting, welding, and so forth. *Thus the liquid contents of the container are maintained sterile and free of contamination.*

It is to be understood that the above described embodiments of my invention are for the purpose of illustration only and various changes may be made therein without departing from the spirit and scope of my invention.

I claim:

1. A machine for forming shaped articles of plastic material comprising a die head having walls and a central space within said walls having an outlet portion formed with a tapering throat; a longitudinally bored mandrel in the central space of said die head formed with a tapered end portion normally positioned in said tapered throat; mechanism for moving said mandrel in either direction lengthwise of said die head to constrict or enlarge the annular opening surrounding said mandrel within the tapered portion of said die head in accordance with any predetermined pattern and for preventing movement of the mandrel other than by the said mechanism; means for supplying air under pressure to the bore of said mandrel; and means for supplying plastic under super atmospheric pressure to the space between the walls of said die head and said mandrel concurrently with and at a time in the cycle of operations of the machine coordinated with a movement of the mandrel lengthwise of said die head.

2. A machine for forming shaped articles of plastic material comprising a die head having walls and a central space within said walls having an outlet portion formed with a tapering throat; a hollow mandrel in the central space of said die head formed with a tapered end portion normally positioned in said tapered throat; mechanism for moving said mandrel in either direction lengthwise of said die head to constrict or enlarge the annular opening surrounding said mandrel within the tapered portion of said die head in accordance with any predetermined pattern and for preventing movement of the mandrel other than by the said mechanism; means for supplying air under pressure at times to the hollow of said mandrel; means for supplying plastic under super atmospheric pressure to the space between the walls of said die head and said mandrel concurrently with and in a phase of the cycle of operations of the machine coordinated with the movement of the mandrel lengthwise of the die head; a mold positioned adjacent to the outlet portion of the die head; and means for closing and opening said mold coordinated with the supply of plastic to said die head.

3. A machine for forming hollow shaped articles of plastic material comprising a die head having walls and a central space within said walls having an outlet portion formed with a tapering throat; a mandrel in the central space of said die head provided with an axially extending bore, said mandrel being formed with a tapered end portion normally positioned in said throat; mechanism comprising a cam for moving said mandrel in either direction lengthwise of said die head to constrict or enlarge the annular opening surrounding said mandrel within the tapered portion of said die head in accordance with any predetermined pattern and for preventing movement of the mandrel other than by the said mechanism; means for supplying air under pressure to the bore of said mandrel; and means for supplying plastic to the space between the walls of said die head and said mandrel concurrently with and in a phase of the cycle of operations of the machine coordinated with the movement of the plunger lengthwise of said die head.

4. A machine for forming hollow shaped articles of plastic material comprising a die head having walls and a central space within said walls having an outlet portion formed with a tapering throat; a longitudinally bored hollow mandrel in the central space of said die head formed with a tapered end portion normally positioned in said tapered throat; mechanism comprising a nut threaded on said mandrel; a rack engaged with said nut and mechanism for controlling said rack for rotating the nut and moving said mandrel in either direction lengthwise of said die head to constrict or enlarge the annular opening surrounding said mandrel within the tapered portion of said die head in accordance with any predetermined pattern and for preventing movement of the mandrel other than by the said rack and nut; means for supplying air under pressure to the bore of said mandrel; and means for supplying plastic to the space between the walls of said die head and said walls concurrently with and in a phase of the cycle of operations of the machine coordinated with the time that said mandrel is being moved lengthwise of said die head.

5. A machine for forming shaped articles of plastic material comprising in combination a plurality of die heads each having an outlet portion, a mandrel in each of said die heads, mechanism for moving said mandrels lengthwise of said die heads to constrict or enlarge the annular openings surrounding said mandrels in accordance with any predetermined pattern, and means for supplying plastic to said die heads at the same time that said mandrels are being moved lengthwise of said die heads comprising a single plastic extrusion machine having a plurality of outlets each controlled by a valve and each connected with one of said die heads, and means for closing each of said valves in a sequence while at least one other of the valves is open so that the extrusion machine continuously supplies plastic to said die heads in a predetermined sequence of operations.

6. A machine for forming shaped articles of plastic material comprising in combination a plurality of die heads each having an outlet portion, a mandrel in each of said die heads, mechanisms for moving said mandrels lengthwise of said die heads to constrict or enlarge the annular openings surrounding said mandrels in accordance with any predetermined pattern, and means for supplying plastic to said die heads at the same time that said mandrels are being moved lengthwise of said die heads comprising a single plastic extrusion machine having a plurality of valves each controlling the supply of plastic to one of said die heads and means for opening one of said valves whenever the other valves are closed so that said extrusion machine may supply plastic continuously to at least one of said die heads.

7. A machine for forming shaped articles of plastic material comprising in combination a plurality of die heads each having an outlet portion, a mandrel in each of said die heads, mechanism for moving said mandrels lengthwise of said die heads to constrict or enlarge the annular openings surrounding said mandrels in accordance with any predetermined pattern, and means for supplying plastic to said die heads at the same time that said mandrels are being moved lengthwise of said die heads comprising a single plastic extrusion machine having a plurality of outlets each controlled by a valve and each connected with one of said die heads, and means for opening each of said valves in a sequence while at least one other of the valves is closed so that the extrusion machine continuously supplies plastic to said die heads in a predetermined sequence of operations.

8. A method of marking plastic articles which comprises extruding an unshaped mass of plastic; placing a marked transparent plastic film in an open mold; closing said mold over said unshaped mass of plastic so that the marked side of said film is toward the unshaped mass of plastic; and shaping the article in said mold so that the film is welded to the article with the marking inside of said plastic film.

[9. A machine for forming shaped articles of plastic material comprising in combination a plurality of die heads each having an outlet portion, a mandrel in the outlet portion of each die head to constrict the outlet in accordance with a predetermined pattern, means for supplying plastic to the die heads comprising a plastic extrusion machine, separate ducts connecting the plastic extrusion machine with the respective die heads, a valve in each duct controlling the supply of plastic to the companion die head, and means for opening one of said valves whenever the other valve is closed so that said extrusion machine supplies plastic continuously to first one of said die heads and then to the other die head.]

[10. In an apparatus for forming hollow shaped articles of plastic material comprising in combination, a plurality of die heads each having an outlet portion, a mandrel in each of said die heads cooperating with the said outlet portion thereof and forming therewith an opening surrounding each mandrel in accordance with any predetermined pattern, means for supplying plastic material to said die heads comprising a plastic extrusion machine having a plurality of outlet ducts connected with the die heads, valve means connected with the ducts for controlling the supply of plastic material from the ducts to said die heads, and means for opening said valve means for one duct while closing the valve means for the other duct and causing the said extrusion machine to supply the plastic material continuously to the valve means and alternately through the ducts to said die heads.]

[11. In an apparatus for forming hollow shaped articles of plastic materials of different characteristics and comprising in combination, a plurality of die heads each having an outlet portion, a mandrel in each of said die heads cooperating with the said outlet portions thereof and forming therewith a discharge opening surrounding each mandrel in accordance with any predetermined pattern, means for supplying plastic to said die heads comprising a separate plastic extrusion machine for each plastic material, each extrusion machine having a plurality of outlet ducts connected with the die heads, valve means connected with the ducts for controlling the supply of plastic materials from the ducts to said die heads, and means for opening said valve means for one duct while closing the valve means for the other duct of each extrusion machine, and the said extrusion machines each supplying the plastic materials continuously to said respective valve means and through ducts from each extrusion machine to said die heads.]

[12. In a method of forming hollow shaped articles of plastic material, the steps of forming plastic material into tubes of predetermined pattern in a plurality of tube forming zones, supplying the plastic material under pressure in continuous flow, directing the flow of plastic material through separate paths to the tube forming zones, controlling the supply of plastic material to the tube-forming zones and alternately interrupting flow in one path while establishing flow through the other path at the place of control to effect delivery of said continuous flow of plastic material alternately to the tube forming zones.]

[13. In a method of forming hollow shaped articles of plastic materials of different characteristics comprising forming the plastic materials into tubes of any predetermined pattern in a plurality of tube-forming zones, supplying the plastic materials separately under pressure and in continuous flows, directing the flows of plastic materials from both supplies through separate paths to each of the tube-forming zones, and controlling the supply of the materials from the respective supply sources to the tube forming zones by alternately interrupting flow of the respective plastic materials in one path from each supply while establishing flow through the other path to effect delivery of said continuous flows of plastic materials first to one tube-forming zone and then to the other tube-forming zone.]

[14. The process of forming a plastic article of plastic materials having different characteristics including supplying the plastic materials of different characteristics from a plurality of plastic extrusion machines each connected to a single mold whereby plastic of different characteristics is supplied at the same time to said single mold.]

References Cited in the file of this patent or the original patent

UNITED STATES PATENTS

| | | |
|---|---|---|
| 700,806 | Paine | May 27, 1902 |
| 1,419,090 | Williams | June 6, 1922 |
| 1,628,333 | Schaub | May 10, 1927 |
| 1,637,207 | Whitehouse | July 26, 1927 |
| 1,848,940 | Delpech | Mar. 8, 1932 |
| 1,981,636 | Soubier | Nov. 20, 1934 |
| 2,044,961 | Waner | June 23, 1936 |
| 2,057,467 | Williams | Oct. 13, 1936 |
| 2,349,177 | Kopitke | May 16, 1944 |
| 2,363,051 | Dosmann | Nov. 21, 1944 |
| 2,449,139 | Posner | Sept. 14, 1948 |
| 2,457,687 | Kopitke | Dec. 28, 1948 |
| 2,467,107 | Bailey | Apr. 12, 1949 |
| 2,488,786 | Watkins | Nov. 22, 1949 |
| 2,597,558 | Bailey | May 20, 1952 |
| 2,724,860 | Strong | Nov. 29, 1955 |

FOREIGN PATENTS

| | | |
|---|---|---|
| 882,497 | France | Mar. 1, 1943 |
| 305,152 | Great Britain | Jan. 31, 1929 |